US012650817B2

(12) United States Patent
Murthy et al.

(10) Patent No.: US 12,650,817 B2
(45) Date of Patent: Jun. 9, 2026

(54) RELATIONSHIP-BASED DATA STRUCTURE GENERATION FOR ENHANCED VISUALIZATION OF INFORMATION RELATED TO SOFTWARE PRODUCTS OBTAINED FROM MULTIPLE DATA SOURCES

(71) Applicant: Dell Products L.P., Round Rock, TX (US)

(72) Inventors: Girish Venkatesh Murthy, Bengaluru (IN); Sowmya Kumar, Bangalore (IN); Sai Shashank Akula, Khammam (IN); Desai Yarlagadda, Sattenapalle (IN); Bijan Kumar Mohanty, Austin, TX (US); Hung Dinh, Austin, TX (US); Balasubramaniyam Ppeddapothu Ankaiah, Kuala Lumpur (MY); Abhishek Jaiswal, Gorakhpur (IN)

(73) Assignee: Dell Products L.P., Round Rock, TX (US)

( * ) Notice: Subject to any disclaimer, the term of this patent is extended or adjusted under 35 U.S.C. 154(b) by 356 days.

(21) Appl. No.: 18/484,690

(22) Filed: Oct. 11, 2023

(65) Prior Publication Data

US 2025/0123809 A1     Apr. 17, 2025

(51) Int. Cl.
*G06F 8/20* (2018.01)
*G06N 20/00* (2019.01)
(52) U.S. Cl.
CPC .............. *G06F 8/20* (2013.01); *G06N 20/00* (2019.01)

(58) Field of Classification Search
CPC ................................. G06F 8/20; G06N 20/00
See application file for complete search history.

(56) References Cited

U.S. PATENT DOCUMENTS 8,359,574 B1 * 1/2013 Bannur .............. G06F 9/44505
711/138
9,740,457 B1 * 8/2017 Liu ........................ G06Q 10/06
(Continued)

OTHER PUBLICATIONS

P. Goldsborough, "A Tour of TensorFlow," arXiv:1610.01178v1, Oct. 1, 2016, 16 pages.
(Continued)

*Primary Examiner* — Ziaul A Chowdhury
(74) *Attorney, Agent, or Firm* — Ryan, Mason & Lewis, LLP

(57) ABSTRACT

An apparatus comprises at least one processing device configured to obtain data associated with software products from a plurality of data sources, to identify association between portions of the data and respective ones of the software products, and to determine relationships between different subsets of the data obtained from different ones of the data sources based on the identified associations. The processing device is also configured to generate, for a given software product based on the determined relationships, a software product model data structure comprising portions of first and second subsets of the data obtained from different data sources. The processing device is further configured to generate, in response to a request received from a data consumer, a visualization of information related to the given software product based on the software product model data structure and role-based access rules for a given role of the data consumer.

20 Claims, 10 Drawing Sheets

(56) References Cited

U.S. PATENT DOCUMENTS

| | | | | |
|---|---|---|---|---|
| 2016/0092176 | A1* | 3/2016 | Straub | G06F 8/34 |
| | | | | 717/107 |
| 2018/0052897 | A1* | 2/2018 | Namarvar | G06F 8/34 |
| 2019/0073633 | A1* | 3/2019 | Sarna | G06Q 10/101 |
| 2019/0347188 | A1* | 11/2019 | Sobran | G06N 20/00 |
| 2021/0176210 | A1* | 6/2021 | Chan | H04L 63/10 |
| 2022/0413992 | A1* | 12/2022 | Nguyen | G06F 11/3428 |
| 2024/0143788 | A1* | 5/2024 | Chen | H04L 63/20 |

OTHER PUBLICATIONS

P. Abrahamsson et al., "Agile Software Development Methods: Review and Analysis," VTT Publication, Author's version, Sep. 2017, 112 pages.
Elastic, "Elasticsearch: The Official Distributed Search & Analytics Engine," https://www.elastic.co/elasticsearch/, Accessed Oct. 11, 2023, 9 pages.
BMC Software, "Control-M 9.0.18.200," Getting Started Guide, Oct. 2018, 55 pages.
Microsoft, "Azure DevOps," https://azure.microsoft.com/en-us/products/devops/server#overview, Accessed Oct. 11, 2023, 4 pages.
NLTK Project, "Natural Language Toolkit," https://www.nltk.org/, Jan. 2, 2023, 4 pages.
Hackage, "Language-toolkit: A Set of Tools for Analyzing Languages via Logic and Automata," https://hackage.haskell.org/package/language-toolkit, Jun. 18, 2023, 4 pages.
Grafana Labs, "Grafana: The Open Observability Platform," https://grafana.com/, Accessed Oct. 11, 2023, 7 pages.
Elastic, "Kibana—Your Window into Elastic," https://www.elastic.co/guide/en/kibana/current/introduction.html, Accessed Oct. 11, 2023, 7 pages.
Elastic, "How Logstash Works," https://www.elastic.co/guide/en/logstash/current/pipeline.html, Accessed Oct. 11, 2023, 3 pages.
Stanford NLP Group, "CoreNLP," https://stanfordnlp.github.io/CoreNLP/, Accessed Oct. 11, 2023, 6 pages.
G. S. Matharu et al., "Empirical Study of Agile Software Development Methodologies: A Comparative Analysis," ACM SIGSOFT Software Engineering Notes, vol. 40, No. 1, Jan. 2015, 6 pages.
OpenText, "OpenText Contivo," https://www.opentext.com/products/data-transformation, Accessed Oct. 11, 2023, 7 pages.
Apache Spark, "PySpark Overview," https://spark.apache.org/docs/latest/api/python/index.html, Sep. 9, 2023, 2 pages.
Python Software Foundation, "The Python Package Index," https://pypi.org/, Accessed Oct. 11, 2023, 2 pages.
Django, "Meet Django," https://www.djangoproject.com/, Accessed Oct. 11, 2023, 3 pages.
P. Choudhury et al., "GitLab: Work Where You Want, When You Want," Journal of Organization Design, vol. 9, No. 23, Nov. 16, 2020, 17 pages.
Python Software Foundation, "Here is Spacy_Language_Detection," https://pypi.org/project/spacy-language-detection/, Accessed Oct. 11, 2023, 3 pages.
ServiceNow, "Latest ServiceNow Platform Release Puts AI to Work," https://www.servicenow.com/, Accessed Oct. 11, 2023, 5 pages.
M. Fenniak, "Welcome to PyPDF2," https://pypdf2.readthedocs.io/en/3.0.0/, Accessed Oct. 11, 2023, 2 pages.
Workday, "Workday Enterprise Management Cloud," https://www.workday.com/, Accessed Oct. 11, 2023, 5 pages.
C. Gehman, "What Is Team Foundation Server?" https://www.perforce.com/blog/vcs/what-team-foundation-server, Aug. 13, 2018, 5 pages.
Atlassian Support, "What is the Jira Family of Products?" https://support.atlassian.com/jira-software-cloud/docs/what-is-the-jira-family-of-products/, Accessed Oct. 11, 2023, 4 pages.
AHA!, "What is a Product Management Maturity Model?" https://www.aha.io/roadmapping/guide/plans/product-management-maturity-model, Accessed Oct. 11, 2023, 6 pages.
R. Rehurek, "What is Gensim?" https://radimrehurek.com/gensim/intro.html, Accessed Oct. 11, 2023, 4 pages.

* cited by examiner

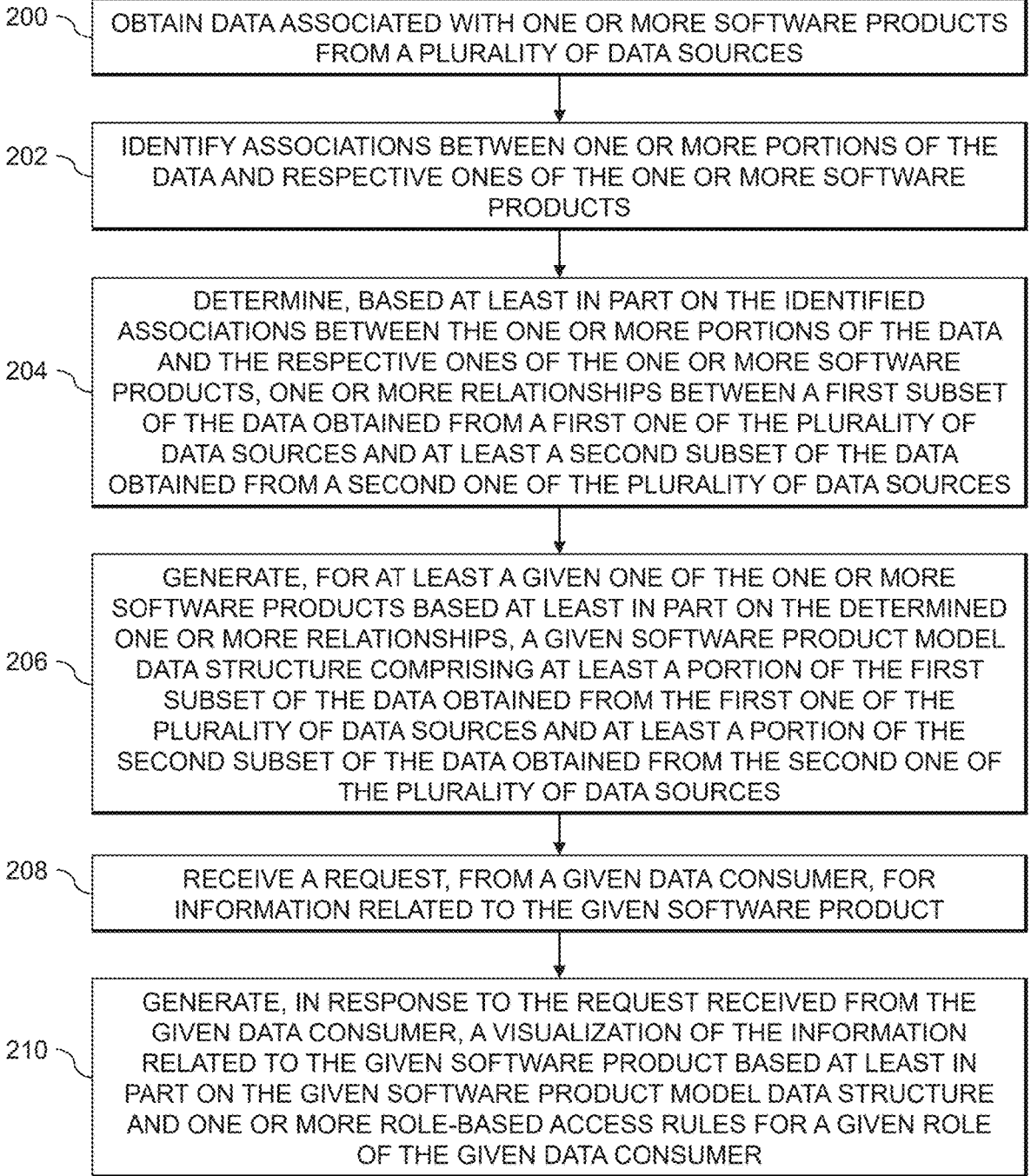

200 — OBTAIN DATA ASSOCIATED WITH ONE OR MORE SOFTWARE PRODUCTS FROM A PLURALITY OF DATA SOURCES

202 — IDENTIFY ASSOCIATIONS BETWEEN ONE OR MORE PORTIONS OF THE DATA AND RESPECTIVE ONES OF THE ONE OR MORE SOFTWARE PRODUCTS

204 — DETERMINE, BASED AT LEAST IN PART ON THE IDENTIFIED ASSOCIATIONS BETWEEN THE ONE OR MORE PORTIONS OF THE DATA AND THE RESPECTIVE ONES OF THE ONE OR MORE SOFTWARE PRODUCTS, ONE OR MORE RELATIONSHIPS BETWEEN A FIRST SUBSET OF THE DATA OBTAINED FROM A FIRST ONE OF THE PLURALITY OF DATA SOURCES AND AT LEAST A SECOND SUBSET OF THE DATA OBTAINED FROM A SECOND ONE OF THE PLURALITY OF DATA SOURCES

206 — GENERATE, FOR AT LEAST A GIVEN ONE OF THE ONE OR MORE SOFTWARE PRODUCTS BASED AT LEAST IN PART ON THE DETERMINED ONE OR MORE RELATIONSHIPS, A GIVEN SOFTWARE PRODUCT MODEL DATA STRUCTURE COMPRISING AT LEAST A PORTION OF THE FIRST SUBSET OF THE DATA OBTAINED FROM THE FIRST ONE OF THE PLURALITY OF DATA SOURCES AND AT LEAST A PORTION OF THE SECOND SUBSET OF THE DATA OBTAINED FROM THE SECOND ONE OF THE PLURALITY OF DATA SOURCES

208 — RECEIVE A REQUEST, FROM A GIVEN DATA CONSUMER, FOR INFORMATION RELATED TO THE GIVEN SOFTWARE PRODUCT

210 — GENERATE, IN RESPONSE TO THE REQUEST RECEIVED FROM THE GIVEN DATA CONSUMER, A VISUALIZATION OF THE INFORMATION RELATED TO THE GIVEN SOFTWARE PRODUCT BASED AT LEAST IN PART ON THE GIVEN SOFTWARE PRODUCT MODEL DATA STRUCTURE AND ONE OR MORE ROLE-BASED ACCESS RULES FOR A GIVEN ROLE OF THE GIVEN DATA CONSUMER

FIG. 2

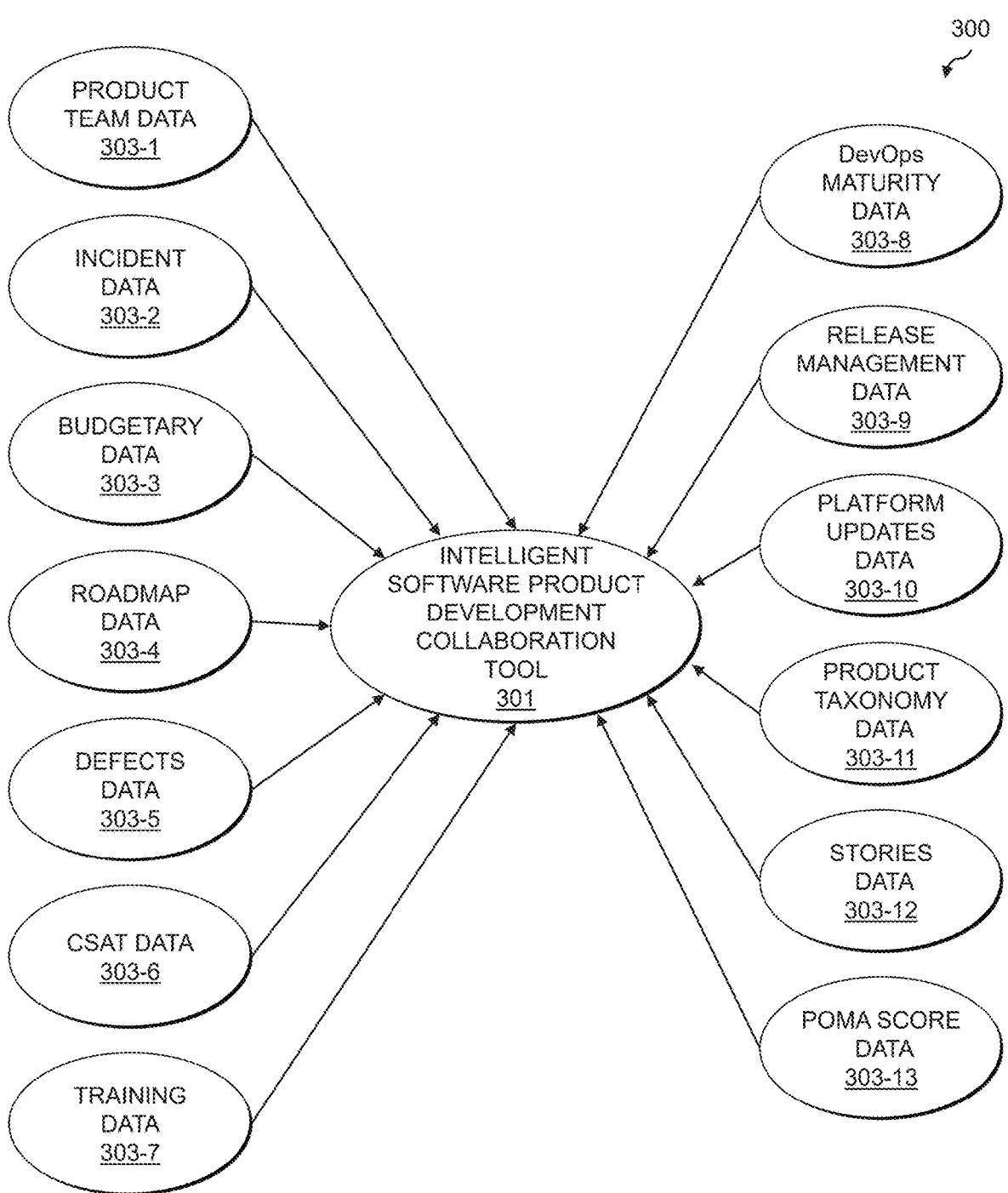

300

PRODUCT TEAM DATA 303-1

INCIDENT DATA 303-2

BUDGETARY DATA 303-3

ROADMAP DATA 303-4

DEFECTS DATA 303-5

CSAT DATA 303-6

TRAINING DATA 303-7

INTELLIGENT SOFTWARE PRODUCT DEVELOPMENT COLLABORATION TOOL 301

DevOps MATURITY DATA 303-8

RELEASE MANAGEMENT DATA 303-9

PLATFORM UPDATES DATA 303-10

PRODUCT TAXONOMY DATA 303-11

STORIES DATA 303-12

POMA SCORE DATA 303-13

PERFORMANCE-ORIENTED MOBILITY ASSESSMENT (POMA)
CUSTOMER SATISFACTION (CSAT)
SOFTWARE DEVELOPMENT AND INFORMATION TECHNOLOGY OPERATIONS (DevOps)

PATTERNS/RULES
TO STANDARDIZE
STATEMENTS

SOURCE A
STATEMENT SET

SOURCE B
STATEMENT SET

CLEAN AND STANDARDIZE STATEMENTS

STANDARDIZED
SOURCE A
STATEMENT SET

STANDARDIZED
SOURCE B
STATEMENT SET

UNIQUE LEAD
MEASURES
STATEMENTS
(ULMS)

EXPORT STANDARDIZED
STATEMENT REPORT

610

RELATIONSHIP-BASED DATA STRUCTURE GENERATION FOR ENHANCED VISUALIZATION OF INFORMATION RELATED TO SOFTWARE PRODUCTS OBTAINED FROM MULTIPLE DATA SOURCES

BACKGROUND

Software development processes typically include multiple environments, such as one or more development environments, an integration testing environment, a staging environment, and a production environment. New software code may be created by individual developers or small teams of developers in respective ones of the development environments. The integration environment provides a common environment where software code from the multiple developers is combined and tested before being provided to the staging environment. The staging environment is designed to emulate the production environment and may be used for final review and approval before new software code is deployed in production applications in the production environment. In some cases, software development processes implement continuous integration/continuous deployment (CI/CD) functionality to enable frequent and reliable delivery of code changes for software.

SUMMARY

Illustrative embodiments of the present disclosure provide techniques for generation of relationship-based data structures for enhanced visualization of information related to software products obtained from multiple data sources.

In one embodiment, an apparatus comprises at least one processing device comprising a processor coupled to a memory. The at least one processing device is configured to obtain data associated with one or more software products from a plurality of data sources, to identify associations between one or more portions of the data and respective ones of the one or more software products, and to determine, based at least in part on the identified associations between the one or more portions of the data and the respective ones of the one or more software products, one or more relationships between a first subset of the data obtained from a first one of the plurality of data sources and at least a second subset of the data obtained from a second one of the plurality of data sources. The at least one processing device is also configured to generate, for at least a given one of the one or more software products based at least in part on the determined one or more relationships, a given software product model data structure, the given software product model data structure comprising at least a portion of the first subset of the data obtained from the first one of the plurality of data sources and at least a portion of the second subset of the data obtained from the second one of the plurality of data sources. The at least one processing device is further configured to receive a request, from a given data consumer, for information related to the given software product, and to generate, in response to the request received from the given data consumer, a visualization of the information related to the given software product based at least in part on the given software product model data structure and one or more role-based access rules for a given role of the given data consumer.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for generation of relationship-based data structures for enhanced visualization of information related to software products obtained from multiple data sources in an illustrative embodiment.

FIG. 3 shows an intelligent software product development collaboration tool configured to obtain data from a variety of data sources in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
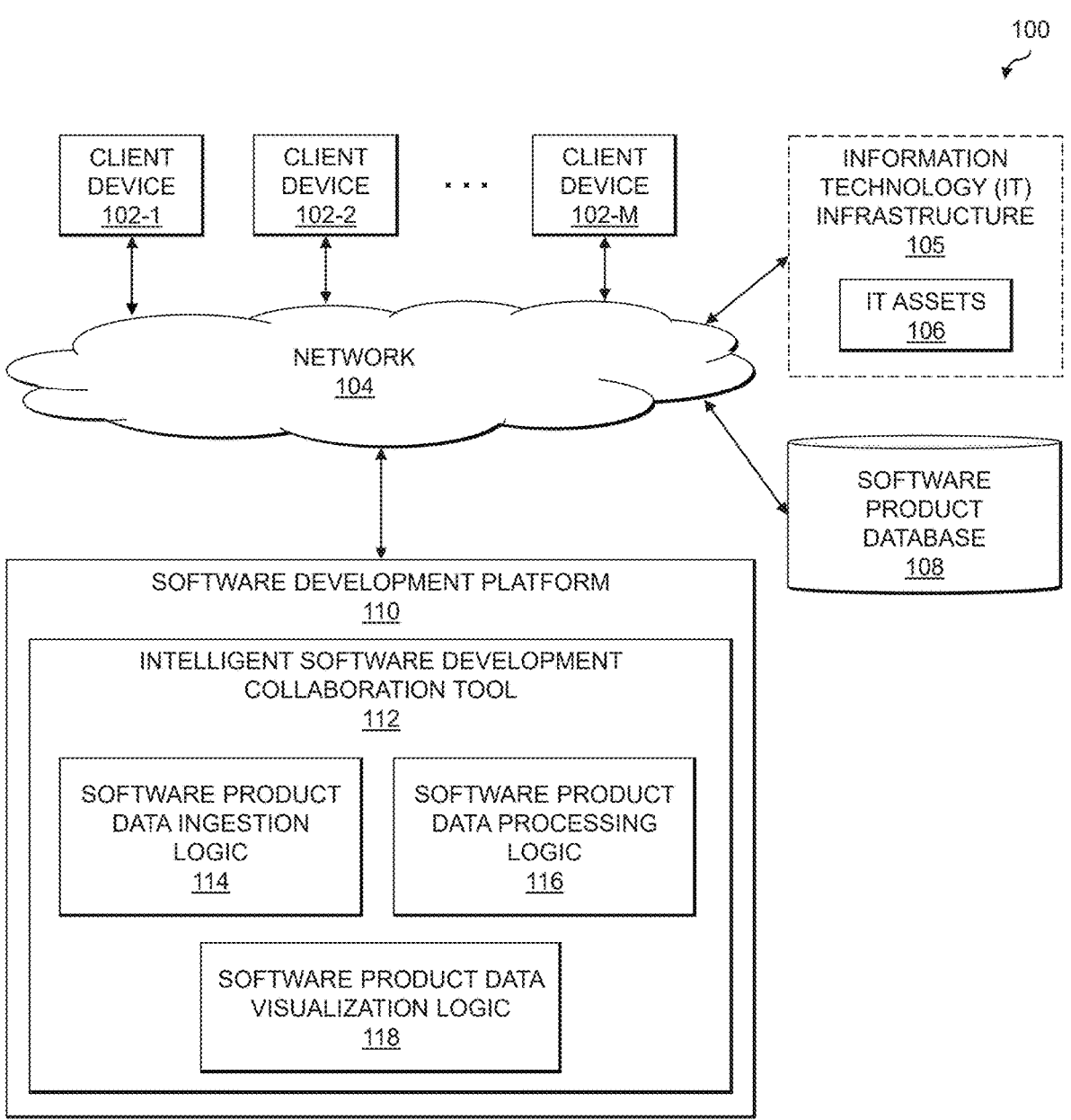
FIG. 1 is a block diagram of an information processing system configured for generation of relationship-based data structures for enhanced visualization of information related to software products obtained from multiple data sources in an illustrative embodiment.

FIG. 1 shows an information processing system 100 configured in accordance with an illustrative embodiment. The information processing system 100 is assumed to be built on at least one processing platform and provides functionality for generation of relationship-based data structures for enhanced visualization of information related to software products obtained from multiple data sources. The information processing system 100 includes a set of client devices 102-1, 102-2, ... 102-M (collectively, client devices 102) which are coupled to a network 104. Also coupled to the network 104 is an IT infrastructure 105 comprising one or more IT assets 106, a software product database 108, and a software development platform 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the software development platform 110 is used for an enterprise system. For example, an enterprise may subscribe to or otherwise utilize the software development platform 110 for managing application or other software builds which are developed by users of that enterprise (e.g., software developers or other employees, customers or users which may be associated with different ones of the client devices 102 and/or IT assets 106 of the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The software product database 108 is configured to store and record various information that is utilized by the software development platform 110. Such information may include, for example, information that is collected from multiple data sources and which is processed and stored for use in generating visualization for users (e.g., of the client devices 102). In some embodiments, one or more storage systems utilized to implement the software product database 108 comprise a scale-out all-flash content addressable storage array or other type of storage array. Various other types of storage systems may be used, and the term "storage system" as used herein is intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the software development platform 110, as well as to support communication between the software development platform 110 and other related systems and devices not explicitly shown.

The software development platform 110 may be provided as a cloud service that is accessible by one or more of the client devices 102 to allow users thereof to manage generation of visualizations of data relating to software products and/or software product development teams. The client devices 102 may be configured to access or otherwise utilize the software development platform 110 (e.g., to control deployment of software builds on one or more of the IT assets 106, to generate data visualizations, etc.). In some embodiments, the client devices 102 are assumed to be associated with software developers, system administrators, IT managers or other authorized personnel responsible for managing application or other software development for an enterprise. In some embodiments, the IT assets 106 of the IT infrastructure 105 are owned or operated by the same enterprise that operates the software development platform 110. In other embodiments, the IT assets 106 of the IT infrastructure 105 may be owned or operated by one or more enterprises different than the enterprise which operates the software development platform 110 (e.g., a first enterprise provides support for multiple different customers, businesses, etc.). Various other examples are possible.

In some embodiments, the client devices 102 and/or the IT assets 106 of the IT infrastructure 105 may implement host agents that are configured for automated transmission of information with the software development platform 110 regarding development of a particular application or other piece of software. It should be noted that a "host agent" as this term is generally used herein may comprise an automated entity, such as a software entity running on a processing device. Accordingly, a host agent need not be a human entity.

The software development platform 110 in the FIG. 1 embodiment is assumed to be implemented using at least one processing device. Each such processing device generally comprises at least one processor and an associated memory, and implements one or more functional modules or logic for controlling certain features of the software development platform 110. In the FIG. 1 embodiment, the software development platform 110 implements an intelligent software development collaboration tool 112. The intelligent software development collaboration tool 112 comprises software product data ingestion logic 114, software product data processing logic 116, and software product data visualization logic 118. The software product data ingestion logic 114 is configured to obtain data related to software products from a plurality of data sources. The software product data processing logic 116 is configured to determine portions of the obtained data which are associated with specific software products, and to determine relationships between different subsets of the data obtained from different ones of the data sources in order to generate software product model data structures for storage in a repository such as software product database 108. The software product data visualization logic 118 is configured to receive requests for information related to software products from data consumers, and to generate visualizations using the software product model data structures and role-based access rules for the data consumers.

At least portions of the intelligent software development collaboration tool 112, the software product data ingestion logic 114, the software product data processing logic 116, and the software product data visualization logic 118 may be implemented at least in part in the form of software that is stored in memory and executed by a processor.

It is to be appreciated that the particular arrangement of the client devices 102, the IT infrastructure 105, the software product database 108 and the software development platform 110 illustrated in the FIG. 1 embodiment is presented by way of example only, and alternative arrangements can be used in other embodiments. As discussed above, for example, the software development platform 110 (or portions of components thereof, such as one or more of the intelligent software development collaboration tool 112, the software product data ingestion logic 114, the software product data processing logic 116, and the software product data visualization logic 118) may in some embodiments be implemented internal to one or more of the client devices 102 and/or the IT infrastructure 105.

The software development platform 110 and other portions of the information processing system 100, as will be described in further detail below, may be part of cloud infrastructure.

The software development platform 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the IT assets 106, the software product database 108 and the software development platform 110 or components thereof (e.g., the intelligent software development collaboration tool 112, the software product data ingestion logic 114, the software product data processing logic 116, and the software product data visualization logic 118) may be implemented on respective distinct processing platforms, although numerous other arrangements are possible. For example, in some embodiments at least portions of the software development platform 110 and one or more of the client devices 102, the IT infrastructure 105, the IT assets 106 and/or the software product database 108 are implemented on the same processing platform. A given client device (e.g., 102-1) can therefore be implemented at least in part within at least one processing platform that implements at least a portion of the software development platform 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the software product database 108 and the software development platform 110, or portions or components thereof, to reside in different data centers. Numerous other distributed implementations are possible. The software development platform 110 can also be implemented in a distributed manner across multiple data centers.

Additional examples of processing platforms utilized to implement the software development platform 110 and other components of the information processing system 100 in illustrative embodiments will be described in more detail below in conjunction with FIGS. 7 and 8.

It is to be understood that the particular set of elements shown in FIG. 1 for generation of relationship-based data structures for enhanced visualization of information related to software products obtained from multiple data sources is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

An exemplary process for generation of relationship-based data structures for enhanced visualization of information related to software products obtained from multiple data sources will now be described in more detail with reference to the flow diagram of FIG. 2. It is to be understood that this particular process is only an example, and that additional or alternative processes for generation of relationship-based data structures for enhanced visualization of information related to software products obtained from multiple data sources may be used in other embodiments.

In this embodiment, the process includes steps 200 through 210. These steps are assumed to be performed by the software development platform 110 utilizing the intelligent software development collaboration tool 112, the software product data ingestion logic 114, the software product data processing logic 116, and the software product data visualization logic 118. The process begins with step 200, obtaining data associated with one or more software products from a plurality of data sources. The obtained data may comprise unstructured text data not having any defined association with the one or more software products. The plurality of data sources may comprise any combination of: incidents data for one or more incidents associated with the one or more software products in one or more production environments; defects data for one or more defects discovered during testing of the one or more software products in one or more non-production environments; budgetary data associated with development of the one or more software products; roadmap data for the development of the one or more software products; customer satisfaction data for the one or more software products; product taxonomy data for the one or more software products; software product development team data specifying one or more software development teams associated with development of the one or more software products; training data for one or more software developers of the one or more software development teams associated with the development of the one or more software products; software development and information technology operations (DevOps) maturity data; software product release management data; platform updates data; software development user stories data comprising descriptions of software features of the one or more software products; and product operations maturity assessment score data for the one or more software development teams associated with the development of the one or more software products.

In step 202, associations between one or more portions of the data and respective ones of the one or more software products are identified. The one or more portions of the data which are associated with respective ones of the one or more software products may be identified based at least in part on processing the data utilizing one or more natural language processing algorithms. The one or more natural language processing algorithms may comprise at least one of sentiment analysis, classification, named entity recognition, topic modeling, text summarization, and key word extraction.

In step 204, one or more relationships between a first subset of the data obtained from a first one of the plurality of data sources and at least a second subset of the data obtained from a second one of the plurality of data sources are determined based at least in part on the identified associations between the one or more portions of the data and the respective ones of the one or more software products. The first subset of the data obtained from the first one of the plurality of data sources may be obtained at a first time and the second subset of the data obtained from the second one of the plurality of data sources may be obtained at a second time different than the first time. The one or more relationships between the first subset of the data obtained from the first one of the plurality of data sources and the second subset of the data obtained from the second one of the plurality of data sources may be determined based at least in part on processing the first subset of the data obtained from the first one of the plurality of data sources and the second subset of the data obtained from the second one of the plurality of data sources utilizing one or more natural language processing algorithms. The one or more natural language processing algorithms may comprise at least one of topic modeling, similarity retrieval and named entity recognition.

In step 206, a given software product model data structure is generated for at least a given one of the one or more software products. The given software product model data structure comprises at least a portion of the first subset of the data obtained from the first one of the plurality of data sources and at least a portion of the second subset of the data obtained from the second one of the plurality of data sources. Step 206 may comprise normalizing the first subset of the data obtained from the first one of the plurality of data sources and the second subset of the data obtained from the second one of the plurality of data sources. In some embodiments, a machine learning system comprising one or more machine learning algorithms is configured to analyze the given software product model data structure through application of at least one of the one or more machine learning algorithms, and to update the given software product model data structure based at least in part on the analysis.

A request for information related to the given software product is received in step 208 from a given data consumer. In step 210, in response to the request received in step 208, a visualization of the information related to the given software product is generated based at least in part on the given software product model data structure and one or more role-based access rules for a given role of the given data consumer. The given software product model data structure and the one or more role-based access rules for the given role of the given data consumer may be maintained in a common data repository. The given role of the given data consumer may comprise one of a software developer of a software product development team responsible for developing the given software product, a product manager of an enterprise responsible for managing the software product development team, and a leader of the enterprise.

The generated visualization may comprise one or more recommendations for training of one or more members of a software product development team responsible for developing the given software product. The one or more recommendations may be generated based at least in part on correlating: a first portion of the given software product model data structure comprising information derived from at least a portion of the data obtained from a first subset of the plurality of data sources associated with one or more issues encountered for one or more features of the given software product; and a second portion of the given software product model data structure comprising information derived from at least a portion of the data obtained from a second subset of the plurality of data sources associated with the one or more members of the software product development team that developed the one or more features of the given software product.

The generated visualization may comprise one or more compliance reports characterizing compliance of contributions by one or more members of a software product development team responsible for developing the given software product. The one or more compliance reports may be generated based at least in part on correlating: a first portion of the given software product model data structure comprising information derived from at least a portion of the data obtained from the first one of the plurality of data sources, the first one of the plurality of data sources comprising a version control system for the given software product; and a second portion of the given software product model data structure comprising information derived from at least a portion of the data obtained from the second one of the plurality of data sources, the second one of the plurality of data sources comprising documented code commits submitted by the one or more members of the software product development team responsible for developing the given software product.

As the IT industry has matured over the years, software development methodologies have also evolved. For example, the so-called "Waterfall" software development model (e.g., a breakdown or division of a software development project into multiple phases which are completed sequentially) was predominant for a long time, but it has many obvious limitations. Subsequently, faster and more reactive software development models referred to as "Agile" have come into use. Agile software development models facilitate the development of robust applications, with faster development cycles and leaner software product development teams. Many sub-models have been developed within Agile software development models, including but not limited to Scrums, Kanban, Extreme Programming, Lean development, etc. Such sub-models may be selected and used based on the specific needs of a given software development project and any identified shortcomings.

The focus has thus shifted from process-based software development methodologies to product-based software development methodologies, where the metrics for success depend on tangible outcomes and are incremental in nature. With this, software development teams working on applications, or one or more parts thereof, have become more streamlined and self-sufficient within themselves to handle various aspects of the software development lifecycle to successfully deliver the product they are responsible for. Various large technology organizations use such models with success, or are in the process of aggressively adopting such product-based software development methodologies (e.g., for development within a digital organization for delivering applications and IT servers to support internal business needs). There are many processes, resources and governance mechanisms in place to help assist software development teams to adopt product-based software development methodologies efficiently and effectively, and for tracking maturity.

However, a key capability that is currently missing is an ability to produce a "360-degree" view for a software product development team that can help various stakeholders (e.g., leaders, product managers, developers, architects, etc.) to view and consume data relevant to them in a single, simple and seamless way. While some tools may provide some parts of such data in a proprietary way, there are various technical challenges for getting the latest real-time updates across multiple disparate tools in order to effectively make decisions and validate their impacts. The technical solutions described herein provide an intelligent software product development correlation tool (e.g., intelligent software development collaboration tool 112) that can consolidate data related to a software product and/or an associated software product development team from across multiple different disparate sources of truth and stitch them together into a coherent data form that models and helps provide personalized views based on the type of stakeholder that is trying to consume the data. The intelligent software product development correlation tool can thus provide a "one-stop shop" for multiple different stakeholders to view information about a software product, domain or experience. The intelligent software product development correlation tool may be used as part of a framework that enables integration of any new data from any source that might become available in the future without excessive development effort.

There is a plethora of different tools which may be used to capture various different aspects of a software product and/or a software product development team. For instance, there may be separate tools used to manage and maintain a product taxonomy, for tracking Product Operations Maturity Assessment (POMA) scores for each product development team or member thereof, for tracking product development team information, for collecting incidents information, for budget planning, for roadmap information, for active stories, etc. If a user wants to get an overall sense of a software product and/or a software product development team, it is extremely difficult due to the plethora of different tools in use for capturing different aspects or information related to the software product and/or the software product development team. In many cases, there is no direct way to derive needed data for a software product and/or a software product development team. Instead, intense and time-consuming manual effort is required, which leads to reporting stale data and requires access to and knowledge of multiple systems and tools to provide accurate insights. Similar technical challenges are presented at a domain or experience level. The technical solutions described herein provide an intelligent software product development collaboration tool which addresses these and other technical problems. The intelligent software product development collaboration tool described herein provides functionality for correlating data from different sources (e.g., applications, tools, etc.), and for mapping the relevant data to the user role that should be consuming it thereby providing a simple and secure way for users with different roles to consume the data based on their roles. In some embodiments, the intelligent software product development collaboration tool provides time savings by reducing manual effort through intelligent correlation of work items, enabling intelligent analysis aimed at increasing the accuracy of linking data points from different tools to formulate a unified data view, providing functionality for adjusting a ranking of relevant information content to be presented to different types of users based on best practices, and providing role-based access to product data in an easy and consumable fashion.

As discussed above, there is a need for technical solutions which intelligently compare, interpret and formulate data related to a software product and/or a software product development team from multiple disparate sources. There are multiple scenarios where such situations could arise. Conventional approaches rely on costly, time-consuming and error-prone manual processing. The technical solutions described herein can advantageously reduce cost, resources consumption and turn-around time for execution. For situations where a similar need is present to roll up and correlate data at domain and experience levels, the costs and other impacts are multiplied and can result in enormous savings. Some non-limiting illustrative scenarios in which the intelligent software product development correlation tool described herein may be used include: analyzing available backlogs with a planned roadmap and a software development teams' velocity for capacity planning; providing visibility into budget consumption with relevant details to take any corrective actions if required; understanding the quality of services of an application or other software product based on its performance characteristics and customer feedback; and understanding the performance of different members of a software product development team, identifying skill gaps (if any) and assigning any relevant available training to address the identified skill gaps. These and other use case scenarios in conventional approaches involve an enormous amount of effort across an organization (e.g., thousands of man hours of meeting and planning time, especially considering redundant meetings across time zones).

Data correlation and compilation in conventional approaches is a manual activity which takes an enormous amount of time and effort to do in a sustained manner. Due to the complex nature of the activity involved, such manual processing is time-consuming and error-prone. For example, most of a software product development manager's time or "bandwidth" may be consumed by compiling data and making duplicate entries across systems. Conventional manual approaches are also ineffective and result in delayed decision making. With data spread across multiple disparate applications or tools, each such tool may present a siloed view of the data. It is challenging for decision makers to visualize the data in its entirety to make effective and quick decisions. By the time inferences are derived, they will inevitably be based on stale data and resulting decisions might not be effective anymore.

The intelligent software product development collaboration tool described herein provides various functionality and capabilities. Such functionality and capabilities include providing a "single pane of glass" for providing role-based access to information about a software product and/or its associated software product development team by correlating datasets from disparate sources. The intelligent software product development collaboration tool may also provide the functionality or capability for measuring and recommending optimizations using predictive analytics to improve various operating parameters of a software product development team (e.g., productivity, defect density, budgeting parameters, etc.). The intelligent software product development collaboration tool may also provide functionality or capabilities for identifying inefficiencies like incorrect estimates, wrong budgeting, product instability, resource skill gaps for the software product development team (e.g., for a current fiscal year (FY) or other time period) and recommending corrections (e.g., for a next FY or other time period) for future workforce planning. The intelligent software product development collaboration tool is also able to utilize machine learning techniques for intelligently scoring the performance of a software product development team or members thereof.

FIG. 3 shows a system 300 including an intelligent software product development collaboration tool 301 which pulls in data from a number of data sources including product team data 303-1, incident data 303-2, budgetary data 303-3, roadmap data 303-4, defects data 303-5, customer satisfaction (CSAT) data 303-6, training data 303-7, software development and IT operations (DevOps) maturity data 303-8, release management data 303-9, platform updates data 303-10, product taxonomy data 303-11, stories data 303-12 and POMA score data 303-13. Such data sources are collectively referred to as data sources 303. It should be appreciated that the data sources 303 shown in FIG. 3 are presented by way of example only, and that the intelligent software product development collaboration tool 301 may use some or all of the data sources 303 and potentially other data sources not shown in FIG. 3.

In conventional approaches, data sources such as the data sources 303 shown in FIG. 3 are managed in disparate systems. Some of these systems could be packaged solutions, while others may be custom-developed applications or systems. Some of the data sources 303 may also be available in one or more data lakes. Each of the data sources 303 may have its own proprietary way of sharing data, both in terms of the schema and the protocol. Also, many of the data sources 303 are not designed keeping a software product model in mind. This means that there is no effortless way to relate a piece of data from one of the data sources 303 with a particular software product and/or software product development team directly. In some cases, like the incident data 303-2, the required information may also not be available in a structured way. The required data, for instance, may be present as unstructured data inside comments or a description.

The intelligent software product development collaboration tool 301 creates a single "window" for ingesting data from across the various data sources 303, and provides functionality for deriving information relevant to a given software product and/or its associated software product development team, in order to correlate data from across the various data sources 303 to create a unified software product view that is exposed to different stakeholders in a secure fashion based on the roles of the different stakeholders.

While conventional Extract, Transform, Load (ETL) tools may have some capabilities for analyzing data, the intelligent software product development collaboration tool 301 provides these and other capabilities (e.g., Extract, Correlate, Transform, Load & Analyze). The capabilities beyond ETL include, for example: fetching data points from unstructured data sources based on the context of a software product; deriving relations between data from different data sources (e.g., which may not have information about a software product at all) through complex correlations from other available data points and at times from past data; for handling information about aspects of a software product not available directly from any data source or derived through correlation, such as identifying a training plan for a software developer based on defects or incidents, evaluating financial performance of a software development team based on a planned roadmap, capacity consumed and a past years' (or other time period's) consumption pattern, for analyzing factors impacting CSAT scores, etc.

Figure 4:
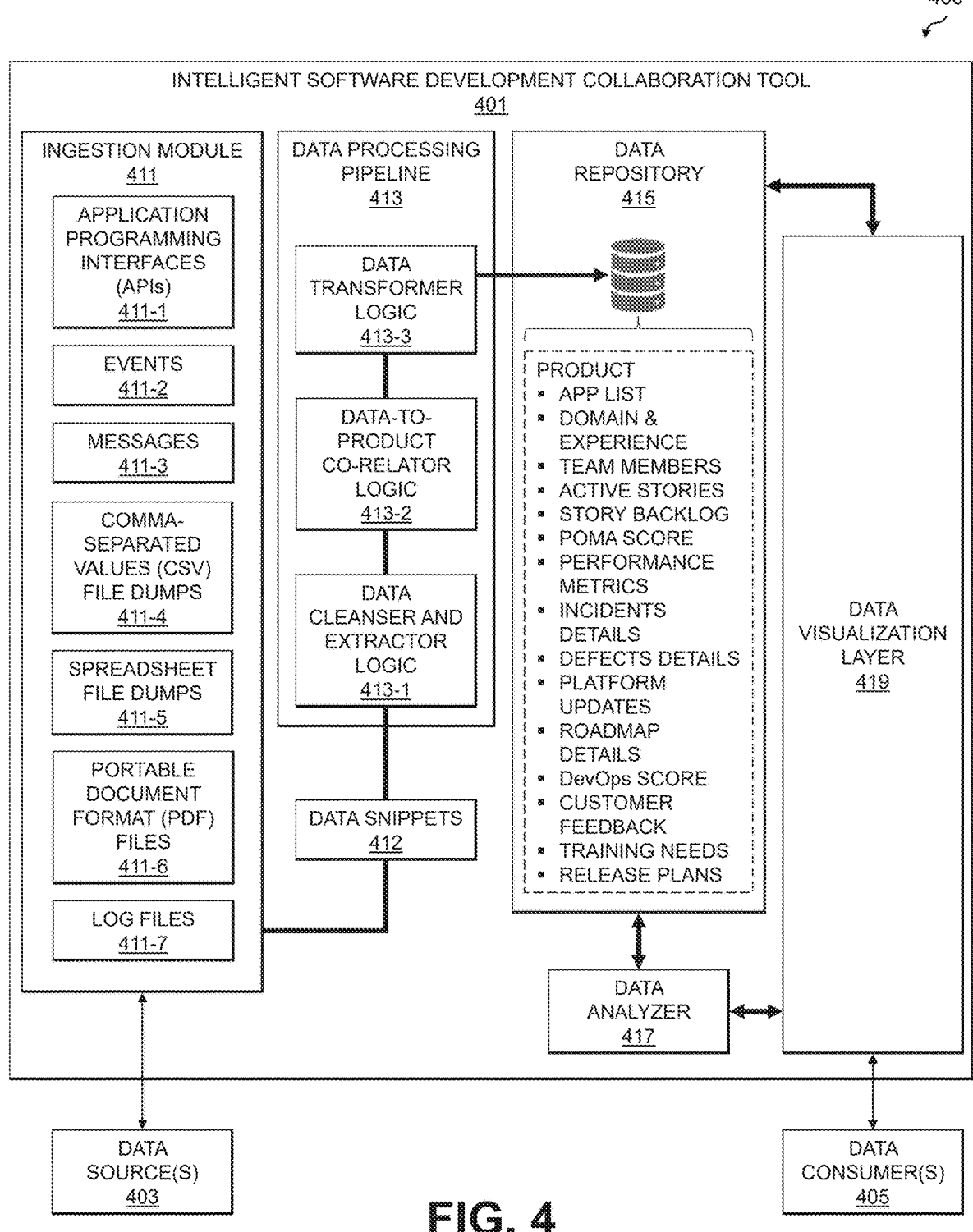
FIG. 4 shows a system including an intelligent software product development collaboration tool configured to produce visualizations for different data consumers in an illustrative embodiment.

FIG. 4 shows a system 400 illustrating an architecture of an intelligent software development collaboration tool 401 and the way it interacts with other applications or systems (e.g., data sources 403) and different user personas (e.g., data consumers 405). The data sources 403 may include any of the data sources 303 shown in FIG. 3, which may be associated with various different systems or tools such as Microsoft Team Foundation Server (TFS), Jira, Workday, ServiceNow, GitLab, one or more data lakes, a product taxonomy, custom applications, etc. The data consumers 405 may include, for example, software developers, product managers, leaders, consumers or other users, etc.

The intelligent software development collaboration tool 401 includes an ingestion module 411, a data processing pipeline 413, a data repository 415, a data analyzer 417 and a data visualization layer 419. The ingestion module 411 may include one or more application programming interfaces (APIs) 411-1, event processors 411-2, message processors 411-3, comma-separated values (CSV) file dumps processors 411-4, spreadsheet (e.g., Excel) file dumps processors 411-5, portable document format (PDF) files processors 411-6 and log files processors 411-7. The data processing pipeline 413 operates on data snippets 412 processed by the ingestion module 411, and includes data cleanser and extractor logic 413-1, data-to-product co-relator logic 413-2, and data transformer logic 413-3. The data cleanser and extractor logic 413-1 cleans and derives additional information from the ingested data (e.g., the data snippets 412). The data-to-product co-relator logic 413-2 correlates the data as per software product models. The data transformer logic 413-3 transforms the ingested data and merges it into associated software product models. Processed data is provided for storage in the data repository 415 (e.g., where the data repository may store various information for a software product, such as an application (app) list, domain and experience information, team members information, active stories information, storage backlog information, POMA scores, performance metrics, incidents details, defects details, platform updates information, roadmap details, DevOps scores, customer feedback, training needs, release plans, etc.). The data analyzer 417 analyzes (e.g., using one or more machine learning algorithms) the software product information stored in the data repository 415 to derive inferences and provide additional insights for presentation via the data visualization layer 419. The outputs may be customized based on the types of the data consumers 405 accessing such information via the data visualization layer 419.

In some embodiments, the intelligent software development collaboration tool 401 utilizes a technical stack which is based on a distributed architecture, thereby making the intelligent software development collaboration tool 401 resilient and giving it the capability to scale horizontally based on the load and enabling handling of computationally complex scenarios such as correlation and data analysis. For example, an underlying foundational layer (e.g., an open-source container orchestration system such as Kubernetes) may provide auto-healing and "Day 2" (e.g., operations phase) operational capabilities. The intelligent software development collaboration tool 401 may be implemented using one or more open source tools, frameworks and libraries. For example, the intelligent software development collaboration tool 401 may operate on an open-source container orchestration system (e.g., Kubernetes). The ingestion module 411 may be implemented utilizing one or more of a log analytics platform such as Logstash, an application and data workflow orchestration service such as Control-M, a representational state transfer (REST) client, one or more event/message consumers, open source libraries, etc. The data processing pipeline 413 may be implemented using a real-time large-scale data processing tool such as PySpark. The data cleanser and extractor logic 413-1 may comprise or utilize one or more of the Python Package Index (PyPi), a python library for topic modelling such as Genism, a natural language processing (NLP) library such as Spacy, the Natural Language Toolkit (NLTK), etc. The data-to-product co-relator logic 413-2 may comprise or utilize one or more of NLTK, Spacy Genism, CoreNLP, etc. The data transformer logic 413-3 may comprise or utilize a data transformation tool such as Contivo. The data repository 415 may be implemented using a distributed multi-tenant-capable full-text search engine such as Elasticsearch, while the data analyzer 417 may be implemented using one or more machine learning and artificial intelligent platforms such as TensorFlow and the data visualization layer 419 may be implemented utilizing source-available data visualization dashboard software such as Kibana, a multi-platform open-source analytics and interactive visualization web application such as Graphana, etc. It should be appreciated, however, that these tools, frameworks and libraries are presented by way of example only, and that embodiments are not limited to use with these specific tools, frameworks and libraries.

The ingestion module 411 (also referred to as a data ingestion layer) of the intelligent software development collaboration tool 401 is responsible for ingesting data from the data sources 403 using various protocols (e.g., APIs 411-1, events 411-2, messages 411-3, CSV file dumps 411-4, spreadsheet file dumps 411-5, PDF files 411-6, log files 411-7, etc.). The ingestion module 411 may be constructed using various libraries (e.g., PyPDF2, Django and other libraries in Python for handling different data formats). The data processing pipeline 413 (also referred to as a data processing layer) is configured to identify the right features to be inserted (e.g., into the data repository 415), for relating data from multiple different ones of the data sources 403, for transforming the ingested data as required for insertion into the data repository 415, and for building a 360-degree view for a software product based on the data snippets 412 (e.g., information) that flows from the data sources 403 at various times. The data repository 415 is where final software product information is persisted (e.g., the individual data snippets 412, when processed through the data processing pipeline 413, are persisted), such as for auditing and debugging purposes. Role-based access control (RBAC) rules or other types of role-based access rules are also persisted in the data repository 415, and are overlayed on the software product data to ensure that the right data is available to the right stakeholders based on their level of access. The data analyzer 417 (also referred to as the data analysis layer)

analyzes the data from the data repository 415 (e.g., past and present data) to derive inferences and provide additional insights about the software products. The data visualization layer 419 is responsible for creating various visualization constructs that different stakeholders (e.g., data consumers 405) can leverage to consume software product-related data.

The data processing layer is visualized as the data processing pipeline 413 which includes various logic that works on aspects of extracting additional data points from data snippets 412 of the ingested data, cleanses it and correlates data points across software products, before transforming and persisting that data in the data repository 415. The data cleanser and extractor logic 413-1 process the data snippets 412 of the ingested data and tries to extract additional information from unstructured data like logs, descriptions, etc. Also, the data snippets 412 will be cleansed, and additional features may be included that can provide additional insights about software products. The data cleanser and extractor logic 413-1 may utilize one or more NLP techniques such as sentiment analysis, classification, named entity recognition, topic modeling, text summary, key word extraction, etc.

The data-to-product co-relator logic 413-2 process the data snippets 412, where data related to a software product from various ones of the data sources 403 which arrive at different times are co-related to map them to the correct software products through a series of complex mapping and intelligent correlation techniques such as topic modeling, similarity retrieval, named entity recognition etc. Additionally, the data-to-product co-relator logic 413-2 provides the ability to intelligently correlate semantic work item datasets and provides a way to maximize or improve resource productivity, adherence to mandatory compliance goals, and forecasting of workforce needs.

The data transformer logic 413-3 is configured to normalize data as per needs, and load the data into the data repository 415 in association with specific software products thereby enabling the data visualization layer 419 to use and render the data as one or more visualizations for the data consumers 405. Data stored in the data repository 415 is also used by the data analyzer 417 in order to make additional inferences about the data.

The intelligent software development collaboration tool 401 advantageously provides a smart solution that can correlate, analyze and derive additional insights using multiple NLP and machine learning techniques. The intelligent software development collaboration tool 401 is thus able to process data from disparate systems (e.g., the data sources 403) to enable a secure 360-degree view for software products. The intelligent software development collaboration tool 401 also advantageously provides the ability to make intelligent comparisons across work item datasets (e.g., using a Levenshtein method and NLP) and provides machine learning capabilities to learn from comparison results and improve match accuracy over time.

The intelligent software development collaboration tool 401 is further configured to enable intelligent semantic correlation analysis. A key feature here includes the ability to standardize or formulate work item statements depending on need. For example, a 4DX execution framework methodology requires work items to be described in a prescribed format. The intelligent software development collaboration tool 401 is capable of standardizing inputted work items and formulating new ones as per required standards such as the 4DX execution framework methodology.

The intelligent software development collaboration tool 401 in some embodiments provides a single pane of glass to view different facets of a software product and/or an associated software product development team based on the role of the data consumers 405 for which visualizations are generated. The intelligent software development collaboration tool 401 in some embodiments further provides access to the latest and greatest of data related to software products to make the right decisions, and can unearth some additional insights that are otherwise impossible or not practical to derive using manual or conventional ETL approaches.

Figure 5:
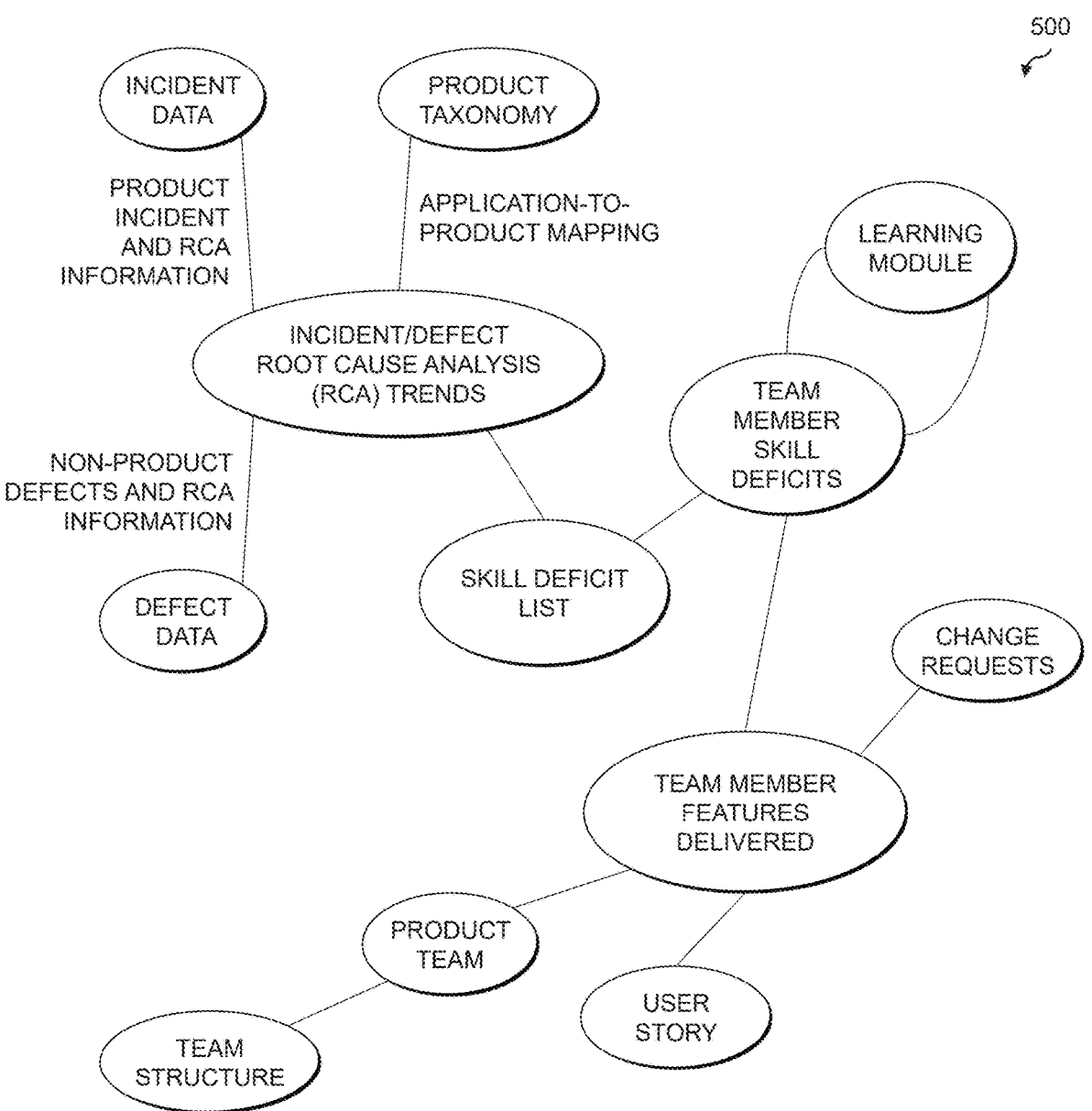
FIG. 5 shows a data mapping visualization of information determined from disparate data sources produced by an intelligent software product development collaboration tool in an illustrative embodiment.

Some of the information about a software product may be easily captured, such as user stories, change requests, POMA scores, etc. Other aspects such as incident data, release plans, roadmap data, etc. may require more effort in terms of merging data from more than one data source and transforming them to arrive at the desired software product data. Both these kinds of data may be maintained in some form or factor with a certain amount of error due to delays in manually computing this information. There are, however, other kinds of data that are currently not possible or practical to derive using manual means or conventional ETL approaches. Such other kinds of data may include data which requires correlations of multiple pieces of data from across different data sources, or analyzing trends in software product data to derive insights. One such example is identifying the training needs for individual team members of a software product development team, or the software product development team itself, based on incidents and defects encountered in a production environment and in non-production testing, respectively. FIG. 5 shows a data mapping visualization 500 of information which may be determined from disparate data sources for this use case.

To begin, incident data is associated with the correct software product. For example, incident data from Service-Now may be captured against an application. Such incident data, however, may not include any reference to a software product development team managing the application. Each incident in the incident data therefore must be mapped to a relevant software product by mapping the incident data against application-to-product mappings extracted from product taxonomy data that is available in another tool (e.g., Plan View). Next, information is extracted from Root Cause Analysis (RCA) data. The details of the root cause of issues (e.g., incidents, defects, etc.) are usually captured as free text, both for incident data (e.g., in ServiceNow) and defect data (e.g., in TFS). NLP techniques are used to extract entities that would help triage the components, technologies, etc. where issues occurred. This data is then tagged against the incident and/or defect data and is mapped to specific software products. Trends of this data over a period of time are leveraged to understand if there were any recurring themes for the occurrence of incidents and/or defects that help to identify one or more areas of improvement which are required.

A next step is to identify the software product development team members which are involved in developing erroneous features or capabilities of software products. Tools such as TFS should be able to provide a list of features which were developed by each team member based on the user stories that such team members worked on and the features which have been deployed in production or test environments. Correlating this information against deployed change requests can help identify the team members which are associated with deployed or updated features of software products. Incident and defect data may be enriched to add the software development team members who had recently worked on the enhancement of the erroneous features.

By combining the data thus captured and analyzing the trends over a period of time, it is possible to identify the areas of improvement for each team member in a software product development team. The intelligent software development collaboration tool may be integrated with training portals or learning modules (e.g., Udemy, Saba, etc.), such that relevant training suggestions and learning paths for each team member can be suggested and tracked for completion. Further, the impact of the training can be ascertained by tracking subsequent incident and/or defect data for the team members.

Figure 6A:
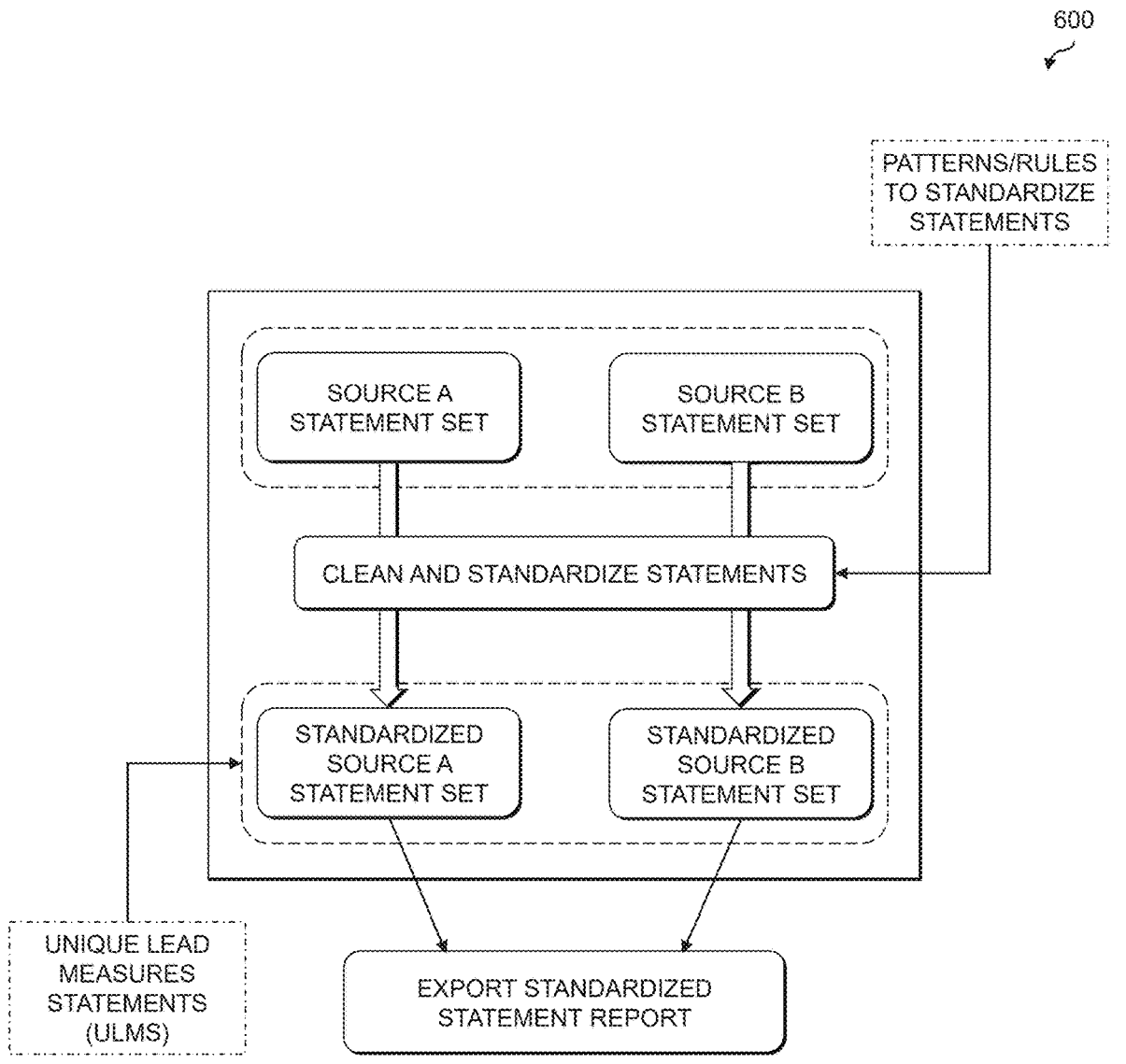
FIGS. 6A-6C show a visualization of work item extraction and standardization produced by an intelligent software product development collaboration tool in an illustrative embodiment.
Figure 6B:
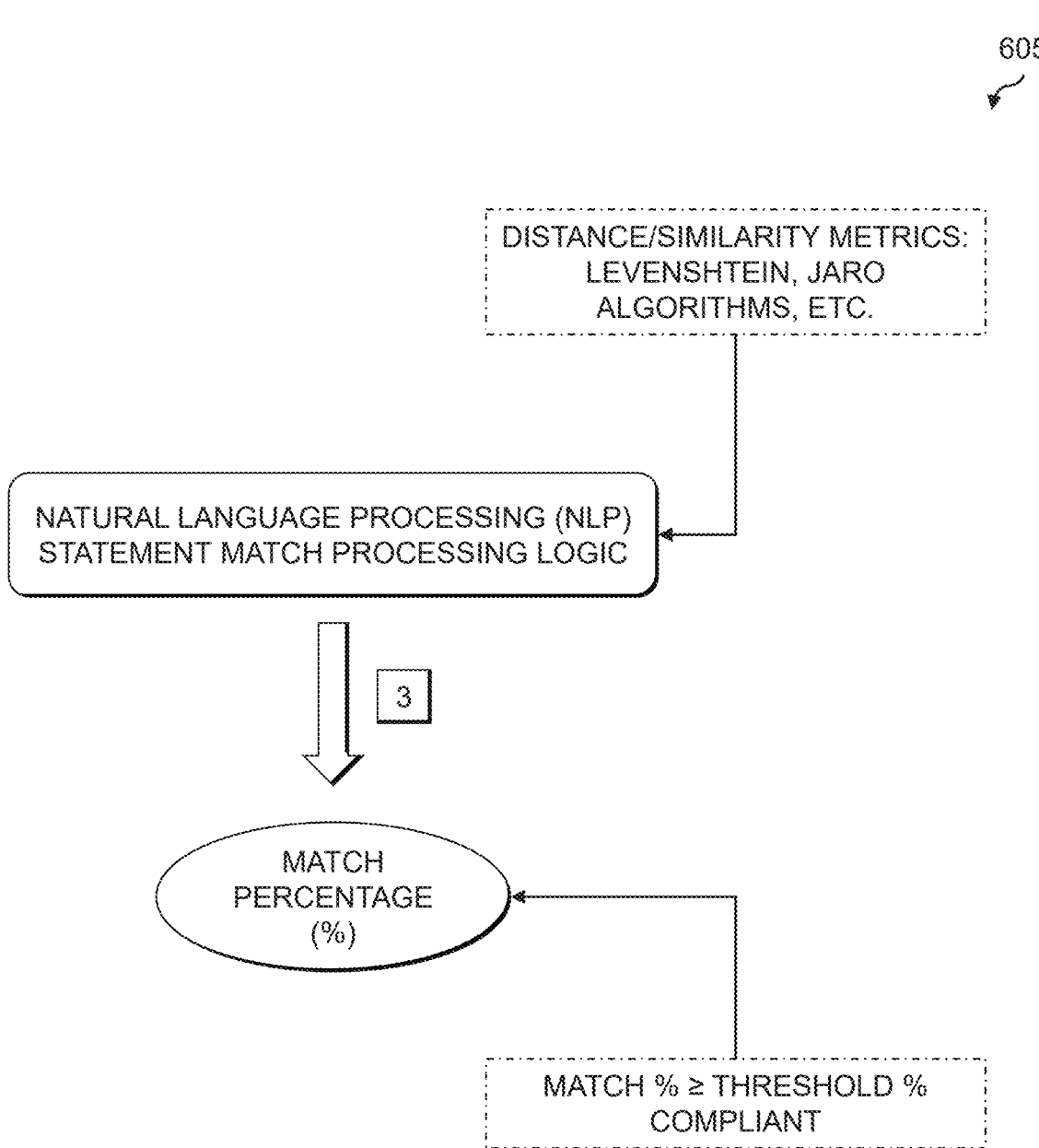
Figure 6C:
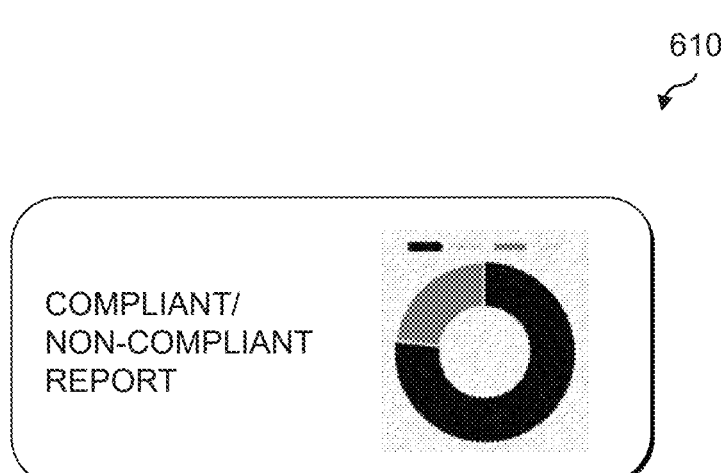

Another use case includes comparing a first set of work items (e.g., TFS work items) with a second set of work items documented manually in a shared location. This is used to drive security-related goals, and it involves documentation of commitments that team members have to undertake on a weekly or other periodic basis. This involves time, effort and multiple meetings and close tracking of activities. The intelligent software development collaboration tools described herein may be used to automate these and other functions, including extracting the first set of work items from disparate data sources, filtering out ones of the work items which are unrelated to team members working on a software product, and extracting only those work items which are relevant to a current software development spring or other development cycle. The second set of work items may be extracted from a shared location (e.g., Confluence) where team members manually document their commitments on a weekly or other periodic basis. A comparison is then done on both the first and second sets of work items. The results of the comparison are useful in identifying if any work items have been missed from the original data set (e.g., in TFS) and thereby not addressed. The results of the comparison are also useful in identifying if any of the work items undergoing processing (e.g., a 4DX process) have not been initially documented appropriately in TFS. The technical solutions also provide for complete automation of declaring the commitments, thereby saving hundreds of man hours by the team members which can then be utilized on other priority initiatives. FIG. 6A shows a visualization 600 of work item extraction and standardization, FIG. 6B shows a visualization 605 of work item matching with NLP and one or more distance/similarity metrics, and FIG. 6C shows a visualization 610 of a compliance report for work item matching. As shown in FIGS. 6A-6C, standardized statements may be processed using NLP and distance/similarity metrics (e.g., Levenshtein algorithms) to obtain a matching percentage. Based on the match percentage, user work items are marked as compliant or not.

The technical solutions described herein advantageously provide the ability to learn from collected data to make intelligent predictions and take predictive measures. The intelligent software development collaboration tools described herein are configured to collect appropriate data from multiple sets of work items, with such multiple sets of work items being passed through one or more machine learning algorithms with the result that an intelligent software development collaboration tool will be able to predict what kind of preventative or remedial measures can be applied proactively. This is very useful and important, especially in activities like security adoption where the intelligent software development collaboration tool would be able to predict the types of vulnerabilities that may surface and provide users with intelligent alerts to enable them to address such situations proactively.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for generation of relationship-based data structures for enhanced visualization of information related to software products obtained from multiple data sources will now be described in greater detail with reference to FIGS. 7 and 8. Although described in the context of system 100, these platforms may also be used to implement at least portions of other information processing systems in other embodiments.

Figure 7:
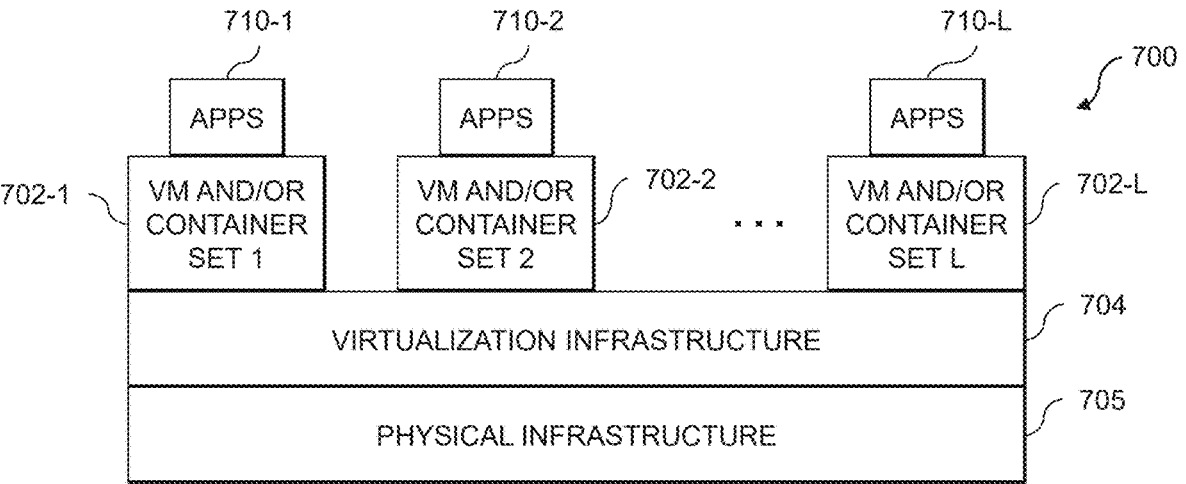
FIGS. 7 and 8 show examples of processing platforms that may be utilized to implement at least a portion of an information processing system in illustrative embodiments.
Figure 8:
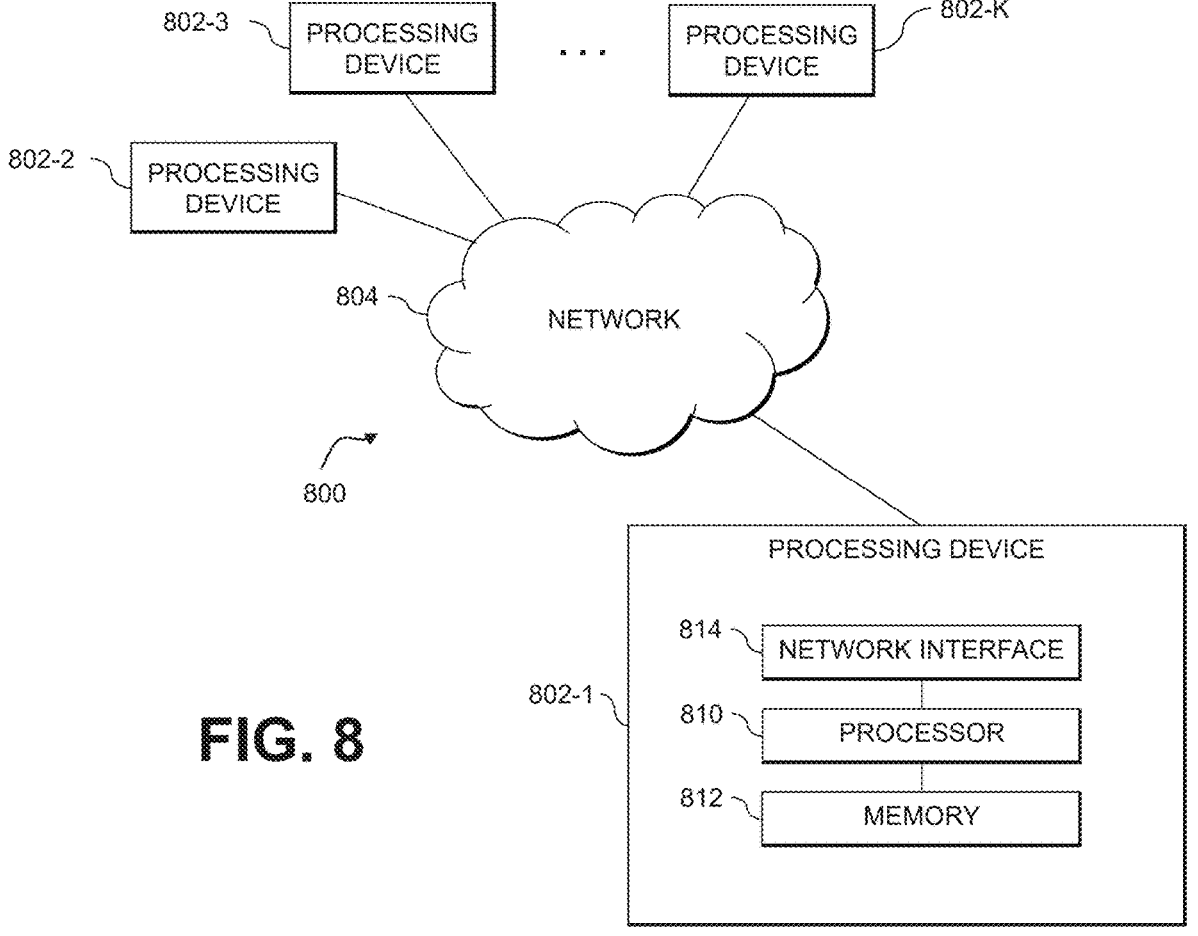

FIG. 7 shows an example processing platform comprising cloud infrastructure 700. The cloud infrastructure 700 comprises a combination of physical and virtual processing resources that may be utilized to implement at least a portion of the information processing system 100 in FIG. 1. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for generation of relationship-based data structures for enhanced visualization of information related to software products obtained from multiple data sources as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, IT assets, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

obtaining data associated with one or more software products from a plurality of data sources;

identifying associations between one or more portions of the data and respective ones of the one or more software products;

determining, based at least in part on the identified associations between the one or more portions of the data and the respective ones of the one or more software products, one or more relationships between a first subset of the data obtained from a first one of the plurality of data sources and at least a second subset of the data obtained from a second one of the plurality of data sources, the first subset of the data obtained from the first one of the plurality of data sources characterizing at least one of development, testing and performance of two or more different software components of a given one of the one or more software products, the second subset of the data obtained from the second one of the plurality of data sources characterizing associations between (i) the two or more different software components of the given software product and (ii) software product development team information for a software product development team responsible for developing the given software product;

generating, for the given software product based at least in part on the determined one or more relationships, a given software product model data structure, the given software product model data structure comprising at least a portion of the first subset of the data obtained from the first one of the plurality of data sources and at least a portion of the second subset of the data obtained from the second one of the plurality of data sources;

receiving a request, from a given data consumer, for information related to the given software product; and generating, in response to the request received from the given data consumer, a visualization of the information related to the given software product based at least in part on the given software product model data structure and one or more role-based access rules for a given role of the given data consumer;

wherein the method is performed by at least one processing device comprising a processor coupled to a memory.

2. The method of claim 1 wherein the generated visualization comprises one or more recommendations for training of one or more members of the software product development team responsible for developing the given software product, and wherein the one or more recommendations are generated based at least in part on correlating:

a first portion of the given software product model data structure comprising information derived from at least a portion of the first subset of the data obtained from the first one of the plurality of data sources, the first subset of the data being associated with one or more issues encountered for at least one of the two or more different software components of the given software product; and a second portion of the given software product model data structure comprising information derived from at least a portion of the second subset of the data obtained from the second one of the plurality of data sources, the second subset of the data being associated with the one or more members of the software product development team that developed said at least one of the two or more different software components of the given software product.

3. The method of claim 1 wherein the generated visualization comprises one or more compliance reports characterizing compliance of contributions by one or more members of the software product development team responsible for developing the given software product, and wherein the one or more compliance reports are generated based at least in part on correlating:

a first portion of the given software product model data structure comprising information derived from at least a portion of the first subset of the data obtained from the first one of the plurality of data sources, the first one of the plurality of data sources comprising a version control system for the given software product indicating update times for the two or more different software components of the given software product; and a second portion of the given software product model data structure comprising information derived from at least a portion of the second subset of the data obtained from the second one of the plurality of data sources, the second one of the plurality of data sources comprising documented code commits submitted by the one or more members of the software product development team responsible for developing the given software product.

4. An apparatus comprising:

at least one processing device comprising a processor coupled to a memory;

the at least one processing device being configured:

to obtain data associated with one or more software products from a plurality of data sources;

to identify associations between one or more portions of the data and respective ones of the one or more software products;

to determine, based at least in part on the identified associations between the one or more portions of the data and the respective ones of the one or more software products, one or more relationships between a first subset of the data obtained from a first one of the plurality of data sources and at least a second subset of the data obtained from a second one of the plurality of data sources, the first subset of the data obtained from the first one of the plurality of data sources characterizing at least one of testing and performance of two or more different software components of a given one of the one or more software products, the second subset of the data obtained from the second one of the plurality of data sources characterizing associations between (i) the two or more different software components of the given software product and (ii) software product development team information for a software product development team responsible for developing the given software product;

to generate, for the given software product based at least in part on the determined one or more relationships, a given software product model data structure, the given software product model data structure comprising at least a portion of the first subset of the data obtained from the first one of the plurality of data sources and at least a portion of the second subset of the data obtained from the second one of the plurality of data sources;

to receive a request, from a given data consumer, for information related to the given software product; and to generate, in response to the request received from the given data consumer, a visualization of the information related to the given software product based at least in part on the given software product model data structure and one or more role-based access rules for a given role of the given data consumer.

5. The apparatus of claim 4 wherein the plurality of data sources comprise two or more of:

incidents data for one or more incidents associated with the one or more software products in one or more production environments;

defects data for one or more defects discovered during testing of the one or more software products in one or more non-production environments;

budgetary data associated with development of the one or more software products;

roadmap data for the development of the one or more software products;

customer satisfaction data for the one or more software products; and product taxonomy data for the one or more software products.

6. The apparatus of claim 4 wherein the plurality of data sources comprise two or more of:

software product development team data specifying one or more software development teams associated with development of the one or more software products;

training data for one or more software developers of the one or more software development teams associated with the development of the one or more software products;

software development and information technology operations (DevOps) maturity data;

software product release management data;

platform updates data;

software development user stories data comprising descriptions of software features of the one or more software products; and product operations maturity assessment score data for the one or more software development teams associated with the development of the one or more software products.

7. The apparatus of claim 4 wherein the obtained data comprises unstructured text data not having any defined association with the one or more software products.

8. The apparatus of claim 4 wherein the one or more portions of the data which are associated with respective ones of the one or more software products are identified based at least in part on processing the data utilizing one or more natural language processing algorithms, the one or more natural language processing algorithms comprising at least one of sentiment analysis, classification, named entity recognition, topic modeling, text summarization, and key word extraction.

9. The apparatus of claim 4 wherein the first subset of the data obtained from the first one of the plurality of data sources is obtained at a first time and the second subset of the data obtained from the second one of the plurality of data sources is obtained at a second time different than the first time.

10. The apparatus of claim 4 wherein the one or more relationships between the first subset of the data obtained from the first one of the plurality of data sources and the second subset of the data obtained from the second one of the plurality of data sources are determined based at least in part on processing the first subset of the data obtained from the first one of the plurality of data sources and the second subset of the data obtained from the second one of the plurality of data sources utilizing one or more natural language processing algorithms.

11. The apparatus of claim 10 wherein the one or more natural language processing algorithms comprise at least one of topic modeling, similarity retrieval and named entity recognition.

12. The apparatus of claim 4 wherein the at least one processing device is further configured to implement a machine learning system comprising one or more machine learning algorithms, wherein the machine learning system is configured:

to analyze the given software product model data structure through application of at least one of the one or more machine learning algorithms; and to update the given software product model data structure based at least in part on the analysis.

13. The apparatus of claim 4 wherein the given software product model data structure and the one or more role-based access rules for the given role of the given data consumer are maintained in a common data repository.

14. The apparatus of claim 4 wherein generating the given software product model data structure comprises normalizing the first subset of the data obtained from the first one of the plurality of data sources and the second subset of the data obtained from the second one of the plurality of data sources.

15. The apparatus of claim 4 wherein the given role of the given data consumer comprises one of a software developer of the software product development team responsible for developing the given software product, a product manager of an enterprise responsible for managing the software product development team, and a leader of the enterprise.

16. The apparatus of claim 4 wherein the generated visualization comprises one or more recommendations for training of one or more members of the software product development team responsible for developing the given software product, and wherein the one or more recommendations are generated based at least in part on correlating:

a first portion of the given software product model data structure comprising information derived from at least a portion of the first subset of the data obtained from the first one of the plurality of data sources, the first subset of the data being associated with one or more issues encountered for at least one of the two or more different software components of the given software product; and a second portion of the given software product model data structure comprising information derived from at least a portion of the second subset of the data obtained from the second one of the plurality of data sources, the second subset of the data being associated with the one or more members of the software product development team that developed said at least one of the two or more different software components of the given software product.

17. The apparatus of claim 4 wherein the generated visualization comprises one or more compliance reports characterizing compliance of contributions by one or more members of the software product development team responsible for developing the given software product, and wherein the one or more compliance reports are generated based at least in part on correlating:

a first portion of the given software product model data structure comprising information derived from at least a portion of the first subset of the data obtained from the first one of the plurality of data sources, the first one of the plurality of data sources comprising a version control system for the given software product indicating update times for the two or more different software components of the given software product; and a second portion of the given software product model data structure comprising information derived from at least a portion of the second subset of the data obtained from the second one of the plurality of data sources, the second one of the plurality of data sources comprising documented code commits submitted by the one or more members of the software product development team responsible for developing the given software product.

18. A computer program product comprising a non-transitory processor-readable storage medium having stored therein program code of one or more software programs, wherein the program code when executed by at least one processing device causes the at least one processing device:

to obtain data associated with one or more software products from a plurality of data sources;

to identify associations between one or more portions of the data and respective ones of the one or more software products;

to determine, based at least in part on the identified associations between the one or more portions of the data and the respective ones of the one or more software products, one or more relationships between a first subset of the data obtained from a first one of the plurality of data sources and at least a second subset of the data obtained from a second one of the plurality of data sources, the first subset of the data obtained from the first one of the plurality of data sources characterizing at least one of development, testing and performance of two or more different software components of a given one of the one or more software products, the second subset of the data obtained from the second one of the plurality of data sources characterizing associations between (i) the two or more different software components of the given software product and (ii) software product development team information for a software product development team responsible for developing the given software product;

to generate, for the given software product based at least in part on the determined one or more relationships, a given software product model data structure, the given software product model data structure comprising at least a portion of the first subset of the data obtained from the first one of the plurality of data sources and at least a portion of the second subset of the data obtained from the second one of the plurality of data sources;

to receive a request, from a given data consumer, for information related to the given software product; and to generate, in response to the request received from the given data consumer, a visualization of the information related to the given software product based at least in part on the given software product model data structure and one or more role-based access rules for a given role of the given data consumer.

19. The computer program product of claim 18 wherein the generated visualization comprises one or more recommendations for training of one or more members of the software product development team responsible for developing the given software product, and wherein the one or more recommendations are generated based at least in part on correlating:

a first portion of the given software product model data structure comprising information derived from at least a portion of the first subset of the data obtained from the first one of the plurality of data sources, the first subset of the data being associated with one or more issues encountered for at least one of the two or more different software components of the given software product; and a second portion of the given software product model data structure comprising information derived from at least a portion of the second subset of the data obtained from the second one of the plurality of data sources, the second subset of the data being associated with the one or more members of the software product development team that developed said at least one of the two or more different software components of the given software product.

20. The computer program product of claim 18 wherein the generated visualization comprises one or more compliance reports characterizing compliance of contributions by one or more members of the software product development team responsible for developing the given software product, and wherein the one or more compliance reports are generated based at least in part on correlating:

a first portion of the given software product model data structure comprising information derived from at least a portion of the first subset of the data obtained from the first one of the plurality of data sources, the first one of the plurality of data sources comprising a version control system for the given software product indicating update times for the two or more different software components of the given software product; and a second portion of the given software product model data structure comprising information derived from at least a portion of the second subset of the data obtained from the second one of the plurality of data sources, the second one of the plurality of data sources comprising documented code commits submitted by the one or more members of the software product development team responsible for developing the given software product.

* * * * *